(12) United States Patent
Kono et al.

(10) Patent No.: US 8,297,202 B2
(45) Date of Patent: Oct. 30, 2012

(54) BODY FRAME STRUCTURE OF RAILWAY VEHICLE

(75) Inventors: Yoshinori Kono, Higashi-Osaka (JP); Tomonori Sumikawa, Higashi-Osaka (JP); Hiroshi Yonetani, Higashi-Osaka (JP); Eiichi Kato, Higashi-Osaka (JP)

(73) Assignee: The Kinki Sharyo Co., Ltd., Osaka (JP)

( * ) Notice: Subject to any disclaimer, the term of this patent is extended or adjusted under 35 U.S.C. 154(b) by 174 days.

(21) Appl. No.: 12/516,673

(22) PCT Filed: Dec. 6, 2006

(86) PCT No.: PCT/JP2006/324338
§ 371 (c)(1),
(2), (4) Date: Dec. 23, 2009

(87) PCT Pub. No.: WO2008/068860
PCT Pub. Date: Jun. 12, 2008

(65) Prior Publication Data
US 2010/0089283 A1    Apr. 15, 2010

(51) Int. Cl.
*B61D 17/00* (2006.01)
(52) U.S. Cl. .................. 105/397; 105/396; 105/404
(58) Field of Classification Search .................. 105/396, 105/397, 404, 409; 296/186.1, 191, 203.03
See application file for complete search history.

(56) References Cited

U.S. PATENT DOCUMENTS

| | | | | |
|---|---|---|---|---|
| 3,774,553 A * | 11/1973 | Kunst et al. | .................... | 105/401 |
| 5,218,799 A * | 6/1993 | Appino | ........................... | 52/213 |
| 5,333,554 A * | 8/1994 | Yamada et al. | ............... | 105/397 |
| 5,383,406 A * | 1/1995 | Vanolo et al. | ................. | 105/401 |
| 6,302,031 B1 * | 10/2001 | Smith et al. | .................... | 105/404 |
| 7,210,413 B2 * | 5/2007 | Barry et al. | .................... | 105/404 |
| 7,789,023 B2 * | 9/2010 | Forbes | .......................... | 105/396 |
| 7,958,831 B2 * | 6/2011 | Campus | ......................... | 105/396 |
| 2002/0024235 A1 * | 2/2002 | Campus | .................. | 296/203.01 |

(Continued)

FOREIGN PATENT DOCUMENTS

JP    59-11061    1/1984

(Continued)

OTHER PUBLICATIONS

English language Abstract of JP 2006-347358, Dec. 28, 2006.

(Continued)

*Primary Examiner* — Jason C Smith
(74) *Attorney, Agent, or Firm* — Greenblum & Bernstein P.L.C.

(57) ABSTRACT

To join vertically and horizontally arranged frame members to the interior face of an outer panel, the horizontal frame members are disposed on the outer panel so as to take precedence over the vertical frame members and are weld-joined to the outer panel. The vertical frame members are placed on the horizontal frame members from the interior side and are weld-joined to the horizontal frame members. The vertical frame member includes a standard-width frame member and a wide-width frame member having a width greater than the width of the standard-width frame member. The vertical frame members are joined to and in contact with the outer panel at a reduced number of points, so that the appearance of the outer panel is maintained in a good condition. With this configuration, a low cost vertical and horizontal frame structure is achieved, which has sufficiently high joint strength that provides the required strength of the outer panel.

10 Claims, 4 Drawing Sheets

U.S. PATENT DOCUMENTS

| | | | |
|---|---|---|---|
| 2005/0066506 A1* | 3/2005 | Campus et al. | 29/428 |
| 2006/0065152 A1* | 3/2006 | Heitmeyer et al. | 105/404 |
| 2006/0225604 A1* | 10/2006 | Nakamura et al. | 105/396 |
| 2007/0214998 A1* | 9/2007 | Komaki et al. | 105/396 |
| 2007/0284913 A1* | 12/2007 | Ehrlich | 296/186.1 |
| 2010/0077935 A1* | 4/2010 | Harada et al. | 105/397 |
| 2010/0089283 A1* | 4/2010 | Kono et al. | 105/397 |
| 2010/0132589 A1* | 6/2010 | Harada et al. | 105/397 |

FOREIGN PATENT DOCUMENTS

| | | |
|---|---|---|
| JP | 59-29355 | 2/1984 |
| JP | 59-81247 | 5/1984 |
| JP | 59-143868 | 9/1984 |
| JP | 62-95979 | 6/1987 |
| JP | 63-5983 | 2/1988 |
| JP | 63-40056 | 10/1988 |
| JP | 5-262228 | 10/1993 |
| JP | 9-30414 | 2/1997 |
| JP | 2843899 | 10/1998 |
| JP | 11-278258 | 10/1999 |
| JP | 2001-138907 | 5/2001 |
| JP | 2006-27366 | 2/2006 |
| JP | 2006-347358 | 12/2006 |
| WO | 2005/110663 | 11/2005 |

OTHER PUBLICATIONS

English language Abstract of JP 2006-27366, Feb. 2, 2006.
English language Abstract of JP 9-30414, Feb. 4, 1997.
English language Abstract of JP 5-262228, Oct. 12, 1993.
English language Abstract of JP 7-284932, Oct. 31, 1995.
U.S. Appl. No. 12/516,600 to Harada et al:, which was filed on May 28, 2009.
U.S. Appl. No. 12/516,597 to Harada et al., which was filed on May 28, 2009.
English language Abstract of JP 11-278258, Oct. 12, 1999.
English language Abstract of JP 2001-138907, May 22, 2001.

* cited by examiner

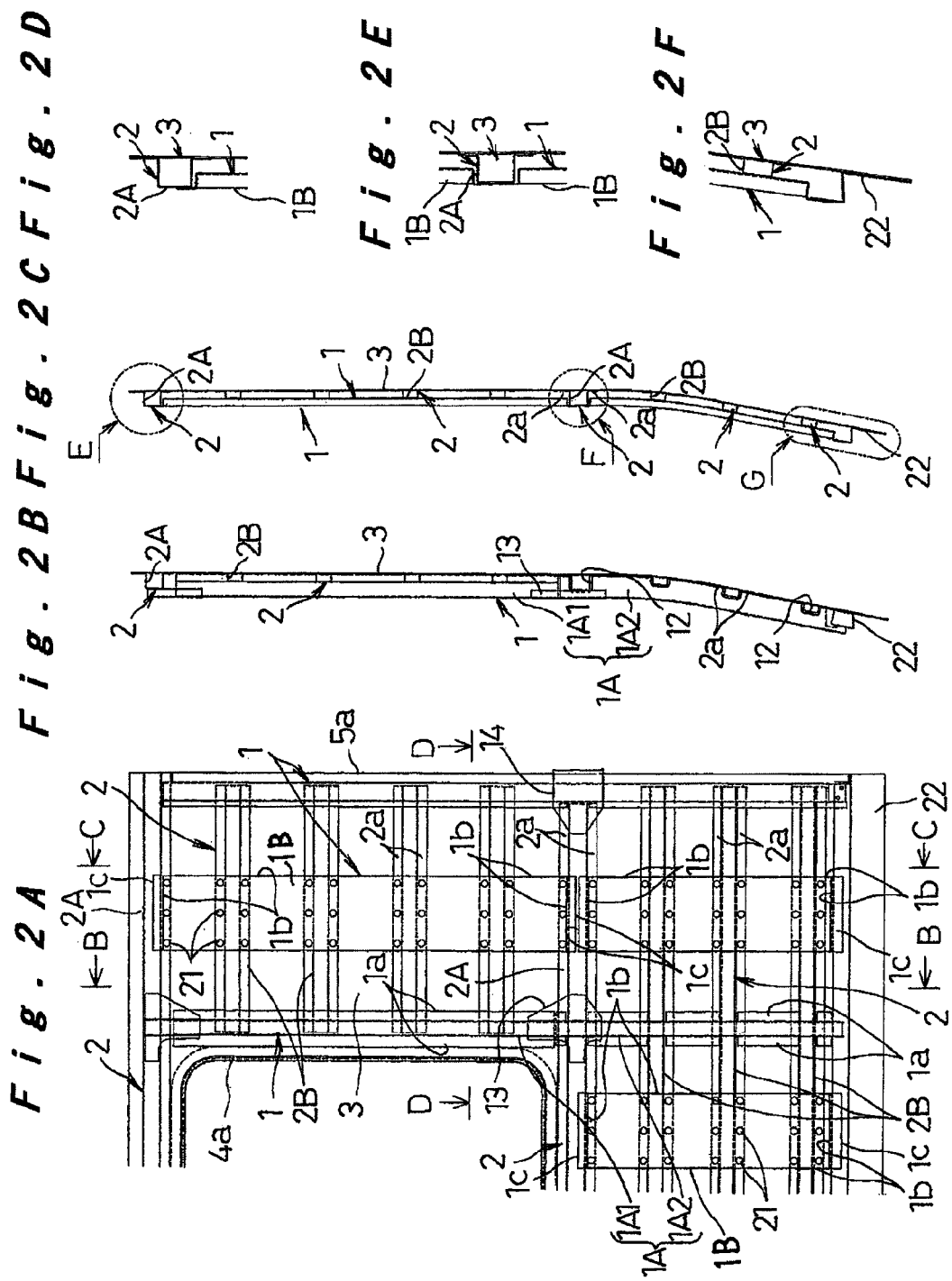

Prior Art
Fig. 4A
Fig. 4B
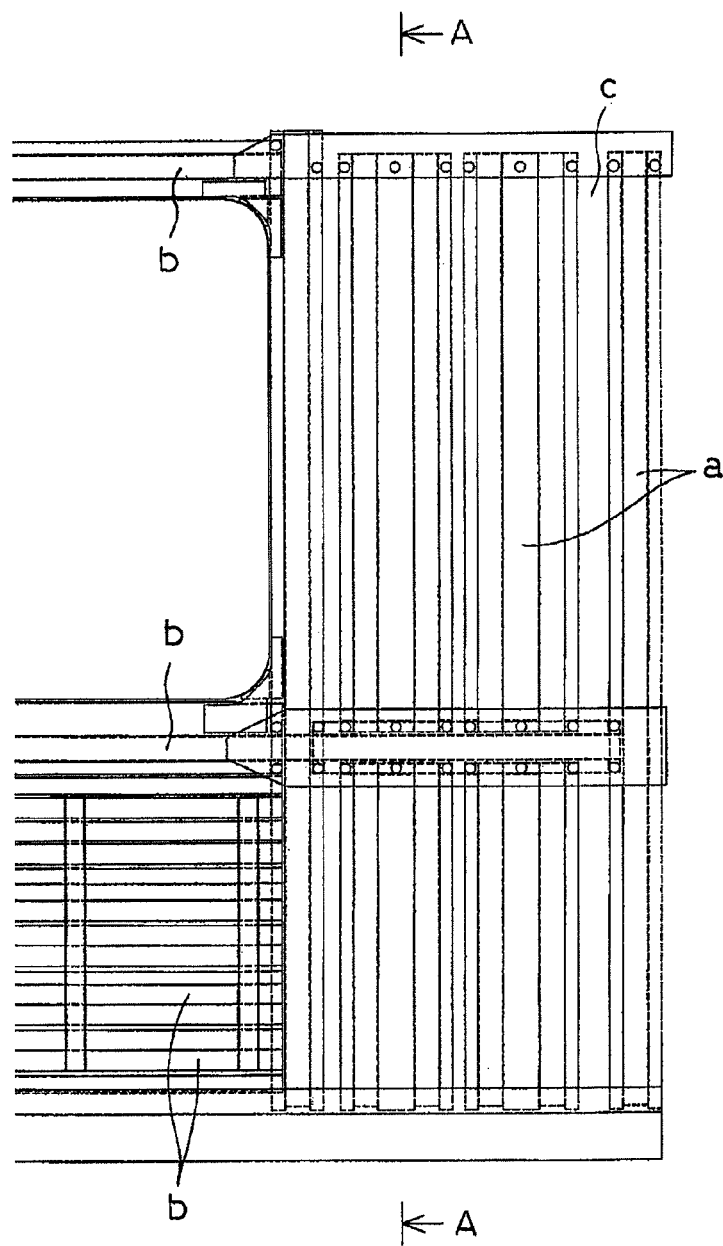
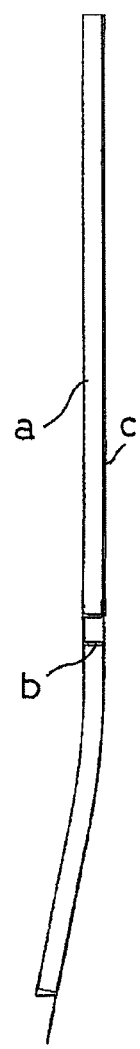

BODY FRAME STRUCTURE OF RAILWAY VEHICLE

TECHNICAL FIELD

The present invention relates to a body frame structure of a railway vehicle, and in particular, to a railway vehicle body frame structure that includes vertically and horizontally arranged frame members joined to the interior face of an outer panel.

BACKGROUND ART

Railway vehicle body frame structures that include vertically and horizontally arranged frame members joined to the interior face of an outer panel are generally used (see, for example, Patent Documents 1 and 2). To ensure the flatness of the outer panel by suppressing the buckling and out-of-plane deformation of the outer panel caused by welding distortion and passenger load, various types of arrangements of frame members and various types of joining methods are used in such body frame structures. In the body frame structure described in Patent Document 1, the vertically and horizontally arranged frame members are reduced in number, and horizontal or vertical ribs are disposed on the interior surface of the outer panel so as to be densely arranged in regions surrounded by the frame members and are weld-joined thereto by spot welding. In the body frame structure described in Patent Document 2, a joint structure in which end portions of discontinuous frame members are joined to a continuous frame member by a joint plate is used at many intersections of the vertical and horizontal arranged frame members. In another conventional example shown in FIGS. 4A and 4B, vertical and horizontal frame members a and b are arranged such that the number of intersections is reduced to reduce the number of divided frame members, and the number of the frame members a and b or the area ratio of the frame members a and b with respect to the outer panel c is increased.

[Patent Document 1] Japanese Patent Application Laid-Open No. Hei 5-262228.

[Patent Document 2] Japanese Patent Application Laid-Open No. Hei 9-30414.

DISCLOSURE OF THE INVENTION

Problems to be Solved by the Invention

In the body frame structure described in Patent Document 1, although the number of the frame members is small, the number of the ribs is large. Therefore, much labor is required to produce the body frame structure and to attach the frame members and ribs, and the cost is thereby increased. This also results in an increase in the weight of vehicles, which is disadvantageous for the design of higher-speed railway vehicles. In the body frame structure described in Patent Document 2, the number of the frame members is slightly large, and also the number of intersections of vertical and horizontal frames joined by the joint plate is large. Therefore, much labor is required to produce the complicated structure, and the cost is thereby increased. In the body frame structure shown in FIGS. 4A and 4B, twin frame members are used as the vertical frame members, so that the apparent number of the frame members is reduced. However, the actual number of the frame members is large, and the area ratio of the frame members with respect to the outer panel is high. In addition, the cost including assembling labor is high, and the weight is also increased. Therefore, this body frame structure is not suitable for the design of higher-speed railway vehicles.

It is an object of the present invention to provide a low cost frame body structure of a railway vehicle which includes a simple vertical and horizontal frame structure joined to and in contact with an outer panel at a reduced number of points. With the frame body structure, the appearance of the outer panel can be easily maintained in a good condition, and the buckling and out-of-plane deformation of the outer panel can be suppressed.

Means for Solving the Problems

To achieve the above object, the present invention provides a body frame structure of a railway vehicle in which vertically and horizontally arranged frame members are joined to the interior face of an outer panel. The body frame structure is mainly characterized in that the horizontal frame member is disposed so as to take precedence over the vertical frame member and is weld-joined to the outer panel, that the vertical frame member is placed on the horizontal frame member from an interior side thereof and is weld-joined to the horizontal frame member, and that the vertical frame member includes a standard-width frame member and a wide-width frame member having a width greater than the width of the standard-width frame member.

In the above basic configuration, the horizontal frame member is disposed so as to take precedence over the vertical frame member. Therefore, the horizontal frame member is not divided by the vertical frame member and is disposed in the lengthwise direction of the vehicle in a continuous manner except for the opening for a window and an entrance door, and the number of the horizontal frame members can thereby be minimized. The above basic configuration is preferably used to continuously weld the horizontal frame member to the outer panel by laser welding or other welding method before the vertical frame member is welded. The vertical frame member intersects with the horizontal frame member. However, the vertical frame member is placed on the interior face of the horizontal frame member and weld-joined thereto. Therefore, the vertical frame member is not divided by the horizontal frame member and is disposed in the vertical direction in a continuous manner except for the opening for a window and an entrance door, and the number of the vertical frame members can thereby be minimized. The joint strength between the vertical and horizontal frame members is improved without the use of an additional member such as a joint plate and without any influence of the joining and contact between the frame members and the outer panel on the outer panel. In particular, to improve the in-plane strength of the outer panel, the wide-width frame members having a wider width is more effective than the standard-width frame members as the vertical frame member because the wide-width frame members provide a more effective joint structure between the vertical frame members and the horizontal frame members. Therefore, the number of the vertical frame members can be reduced. Even in such a case, high joining strength and high load transfer characteristics can be obtained. The horizontal frame members, as well as the vertical frame members as necessary, are decreased in number while they are arranged so as to be prevented from being divided at their intersections. Even in such a case, high joint strength can be achieved by the direct and simple weld-joining at the intersections, and the in-plane strength of the outer panel can be improved by the joint structure between the vertical wide-width frame members and the horizontal frame members. Therefore, a high-strength body frame structure in which the buckling and out-of-plane deformation of the outer panel can be sufficiently suppressed is obtained at low cost with less manufacturing labor by using a simple structure. Since the vertical frame members are welded to and in contact with the outer panel at a reduced number of points, the appearance of the outer panel can be maintained in a good condition.

In another configuration, the number of the wide-width frame members is greater than the number of the standard-width frame members. In such a case, the number of the vertical frame members is reduced by an amount corresponding to the increased number of the wide-width frame members.

In another configuration, the standard-width frame member is disposed along edges of openings for a window and an entrance door, and the wide-width frame member is disposed between the standard-width frame members. At the edges of the openings for the window and the entrance door, the required strength must be ensured only by the joint structure between each standard-width frame member and the end portions of the horizontal frame members disposed on one side (the left or right side) of the each vertical frame member. In the above configuration, the required strength can be satisfied through the use of frame members having a standard height and a standard shape used in a normal strength design. The wide-width frame member is used as the vertical frame member disposed between the standard-width frame members, and the number of the vertical frame members is thereby reduced.

In another configuration, the wide-width frame member is flatter than the standard-width frame member. The wide-width of the wide-width frame member itself can provide high joint strength between the wide-width frame member and the horizontal frame member. In view of these characteristics, the use of the wide-width frame member being flatter than the standard-width frame member can contribute to the improvement of the strength and load transfer characteristic of the body frame structure.

In another configuration, the wide-width frame member has a pan-like shape including a flat portion and inwardly bent walls disposed on a circumference of the flat portion. With this configuration, the simple bending of the circumferential edges can improve the resistance to deformation, and this can contribute to the improvement of the strength of the body frame structure.

In another configuration, the horizontal frame members are disposed on upper, lower, left, and right sides of an opening for a window and include: a standard-height frame member having a height close to a height of the vertical standard-width frame member, and a low-height frame member having a height less than the height of the standard-height frame member. The vertical wide-width frame member is placed on and weld-joined to the horizontal low-height frame member. An end portion of the vertical wide-width frame member includes a flange extending from an edge of one of the bent walls and is brought into abutment against and weld-joined to a side portion of the horizontal standard-height frame member with the flange placed on an interior face of the horizontal standard-height frame member. At the upper and lower edges of the opening for the window, the required strength must be ensured by the horizontal standard-height frame member alone or only by the joint structure between the horizontal standard-height frame member and the end portions of the vertical frame members disposed therebelow. In this configuration, the required strength can be satisfied through the use of frame members having a standard width and a standard shape used in a normal strength design. In addition, the vertical wide-width frame members are placed on and weld-joined to the interior faces of the horizontal low-height frame members having a height lower than the height of the standard-height frame members. In this manner, while an increase in the overlapping height of the frame members is suppressed, the required joint strength between the vertical wide-width frame members and the low-height frame members is ensured. The vertical wide-width frame members including the flanges extending from the bent walls thereof are joined to the horizontal standard-height frame members with the flanges placed on the standard-height frame members. In this manner, an increase in the height can be prevented, and the required joint strength between the frame members can be improved.

In another configuration, the vertical standard-width frame member extending along a side portion of the opening for the window is placed between the upper and lower horizontal standard-height frame members disposed in an upper portion and a lower portion of the opening for the window, and the vertical standard-width frame member is placed in a straddling manner on, and weld-joined to, the outer panel and an end portion of the horizontal low-height frame member disposed between the upper and lower horizontal standard-height frame members disposed in the upper and lower portions of the opening for the window. The vertical standard-width frame member includes an upper frame member and a lower frame member, the upper frame member being brought into abutment against a side portion of the upper horizontal standard-height frame member disposed in the upper portion of the opening for the window and being joined thereto by a joint plate, the lower frame member including a notch that fits over the lower horizontal standard-height frame member at an interior-side portion between flanges thereof and over the horizontal low-height frame member disposed below the lower horizontal standard-height frame member, the flanges being weld-joined to the outer panel, the lower frame member being placed on the flanges and weld-joined to the lower horizontal standard-height frame member and the horizontal low-height frame members, an upper end of the lower frame member being brought into abutment against a lower end of the upper frame member and being joined to the upper frame member and the lower horizontal standard-height frame member disposed in the lower portion of the opening for the window by another joint plate. Another vertical standard-width frame member disposed along a side portion of an entrance door is placed in a straddling manner on, and weld-joined to, the outer panel and the end portions of all the horizontal low-height frame members, and the vertical standard-width frame member is also joined to the lower horizontal standard-height frame member disposed in the lower portion of the opening for the window by another joint plate. In this configuration, the vertical standard-width frame member extending along the side portion of an opening for a window includes the upper frame member placed in the side portions of the opening for the window. The upper frame member, having a standard height and a standard shape used in a normal strength design, is weld-joined to the outer panel and directly reinforce the edge of the opening of the outer panel. In addition, the upper frame member is weld-joined to the end portions of the horizontal low-height frame members without an increase in height. In this configuration, satisfactory joint strength can also be obtained. The lower frame member extending from the lower portion of the upper frame member has a standard height and a standard shape as well as a standard-width and can ensure the required strength. In addition, the lower frame member includes the notches that fit over the horizontal low-height frame members at their to interior-side portions between the flanges thereof weld-joined to the outer panel. The lower frame member is placed on the flanges and weld-joined to the horizontal low-height frame members. In this manner, the continuity between the lower frame member and the upper frame member is maintained, and the required joint strength can be satisfied with almost no increase in height due to overlapping. The vertical standard-width frame member that is disposed along the side portion of the entrance door includes a frame member having a standard height and a standard shape used in a normal strength design, and is weld-joined to the outer panel and can directly reinforce the edge of the opening for the entrance door in the outer panel. In addition, the vertical standard-width frame member is weld-joined to the end portions of all the horizontal low-height frame members without an increase in height, and the required joint strength can be ensured. The height of the horizontal standard-height frame member is substantially the same as the height of the vertical standard-width frame member. To ensure the required joint strength, the joint plates are used in the joint portion at which the end portion of the vertical standard-width frame member is brought into abutment against the side portion of the horizontal standard-height frame member and in the joint portion at which the end portion of the horizontal standard-height frame member is brought into abutment against the side portion of the vertical standard-width frame member. However, the number of points where the joint plate is required is small, and the use of the joint plates causes almost no increase in height.

The height of an overlapping portion between the horizontal low-height frame member and the vertical wide-width frame member may be substantially the same as the height of the horizontal standard-height frame member. The height of the horizontal low-height frame member may be substantially the same as the height of the vertical wide-width frame member.

The width of the vertical wide-width frame member overlapping the horizontal low-height frame member may be 1.5 to 20 times the width of the horizontal low-height frame member or less than a minimum arrangement spacing between the vertical standard-width frame members. This is effective to suppress an increase in weight and ensure the required strength and resistance to the out-of-plane deformation of the outer panel.

BRIEF DESCRIPTION OF THE DRAWINGS

FIG. 2A is an enlarged view of a main part of the body frame structure shown in FIG. 1; FIG. 2B is a cross-sectional view taken along line B-B in FIG. 2A, illustrating a vertical standard-width frame member disposed along a side portion of a window opening; FIG. 2C is a cross-sectional view taken along line C-C in FIG. 2A, illustrating a wide-width frame member; FIG. 2D is an enlarged view of area E in FIG. 2C, illustrating the joining portion between the wide-width frame member and a horizontal standard-height frame member disposed along the upper portion of the window; FIG. 2E is an enlarged view of area F in FIG. 2C, illustrating the joining portion between the wide-width frame member and a horizontal standard-height frame member disposed along the lower portion of the window; and FIG. 2F is an enlarged view of area G in FIG. 2C, illustrating the joining portion between the wide-width frame member and a rocker rail.

FIG. 4A is a front view from the inner side illustrating an example of a conventional weld-joining structure between an outer panel and vertically and horizontally arranged frame members, and FIG. 4B is a cross-sectional view taken along line A-A in FIG. 4A.

BEST MODE FOR CARRYING OUT THE INVENTION

With reference to FIGS. 1 to 3C, an embodiment of a body frame structure of a railway vehicle according to the present invention is specifically described to facilitate understanding of the invention.

Figure 1:
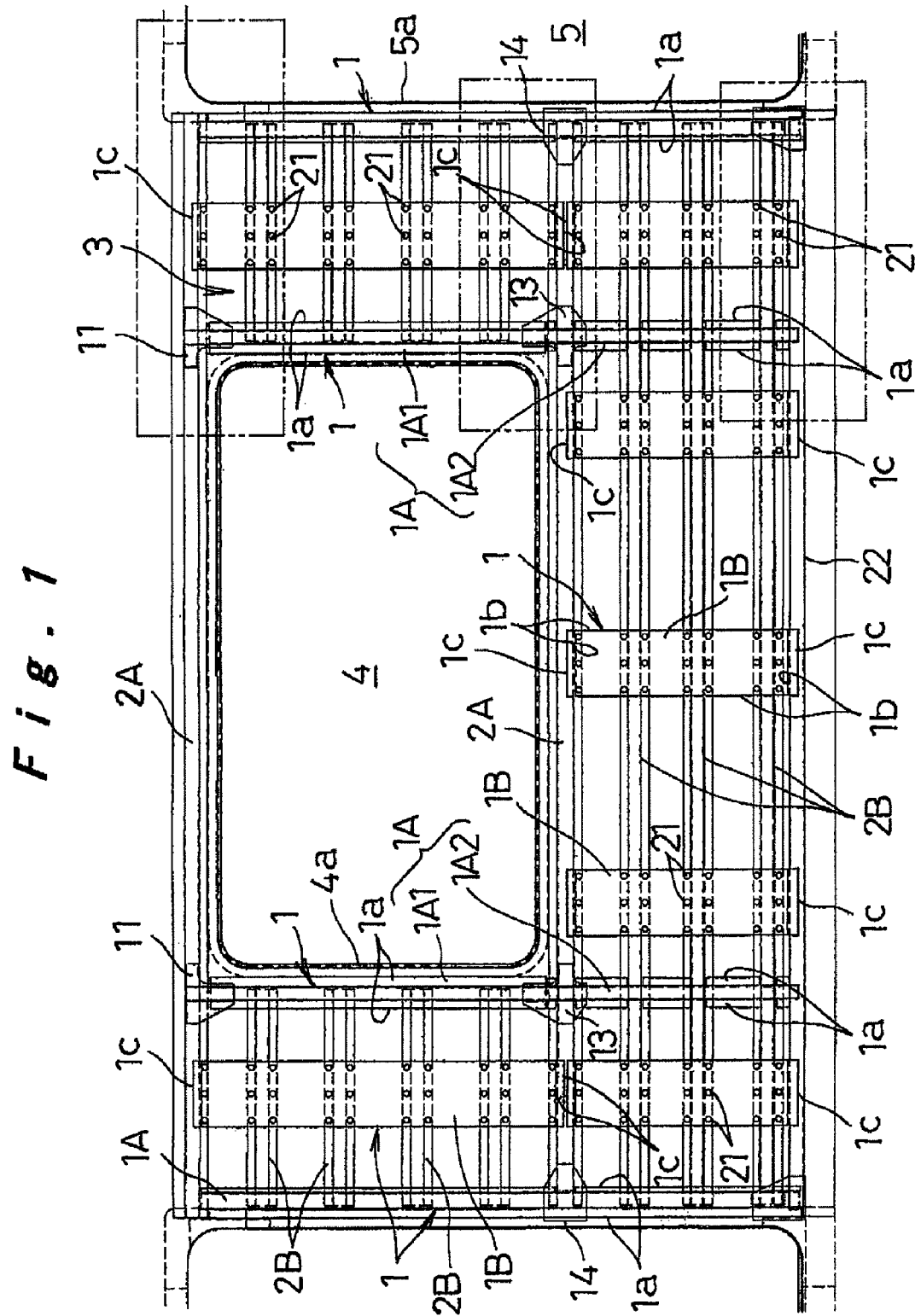
FIG. 1 is a front view from the inner side illustrating an example of a joining structure between an outer panel and vertically and horizontally arranged frame members used in a body frame structure of a railway vehicle in an embodiment of the present invention.

In the body frame structure of a railway vehicle of this embodiment, vertically and horizontally arranged frame members 1 and 2 are joined to the interior face of an outer panel 3 as shown in an example in FIGS. 1 to 3C. More specifically, as shown in FIG. 1, the horizontal frame members 2 are disposed so as to take precedence over the vertical frame members 1 and are weld-joined to the outer panel 3. The vertical frame members 1 are placed on the horizontal frame members 2 from the interior side thereof and are weld-joined to the horizontal frame members 2. The vertical frame members 1 include standard-width frame members 1A and wide-width frame members 1B having a width greater than the standard-width frame members 1A. The weld-joining may be performed by a method selected from spot welding, plug welding, laser welding, and other welding methods. One selected welding method may be used, or alternatively a combination of two or more methods may be used. Spot welding provides high joining strength. However, the welding process requires much labor, and indentations are formed on the outer plate during the welding process. Plug welding is performed such that a hole for plug welding formed in one member is filled. Therefore, high joining strength can be obtained. However, when plug welding is used for a member joined to the outer panel 3, the outer panel can be adversely affected by heat. Laser welding can be performed at high speed in a continuous manner while the required joining strength and sealing properties are satisfied. Even when laser welding is used for a member joined to the outer panel 3, no external force is applied to the outer panel 3, and the influence of heat on the outer panel can be suppressed by partial penetration welding in which the welding is performed while the penetration does not reach the exterior surface of the outer panel 3. However, the joining strength at the ends of the welding line is low, and the joining strength is low when the welding is performed along a short line or at a single point. Therefore, it is preferable to perform weld-joining using different optimal methods for different parts. However, to use different welding methods, a plurality of types of welding facilities must be provided. To avoid this problem, the number of welding methods used must be reduced. In the ultimate case, only one method is used.

As described above, the horizontal frame members 2 are disposed so as to take precedence over the vertical frame members 1 and are weld-joined to the outer panel 3. In this manner, the horizontal frame members 2 are not divided by the vertical frame members 1 and can be disposed in the lengthwise direction of the vehicle in a continuous manner except for the openings for a window 4 and entrance doors 5 so that the number of the horizontal frame members 2 can be minimized. Moreover, this configuration is suitable for continuous welding such as laser welding. Therefore, the productivity is improved, and the cost can be reduced. The vertical frame members 1 intersect with the horizontal frame members 2. However, basically, the vertical frame members 1 are placed on the interior face of the horizontal frame members 2 and weld-joined thereto. The above basic configuration can be applied in a manner slightly different from the illustrated example. More specifically, the vertical frame members 1 can be arranged so as not to be divided by the horizontal frame members 2 and disposed in the vertical direction in a continuous manner except for the openings for the window 4 and the entrance doors 5. In this manner, the number of the vertical frame members 1, as in the case of the reduction of the horizontal frame members 2, can be minimized. In the above basic configuration, the vertical frame members 1 are weld-joined to the horizontal frame members 2. Therefore, the vertical frame members 1 are not weld-joined to and not in contact with the outer panel 3, so that there is no influence on the outer panel 3. In this structure, the appearance of the outer panel 3 can be easily maintained in a good condition. In addition, this structure is simple and low cost since joining structures using additional members such as joint plates are not employed. With the above structure, the joint strength between the vertical and horizontal frame members 1 and 2 is improved by the direct weld-joining therebetween, so that the load transfer characteristics are improved. Therefore, the in-plane strength and the resistance to out-of-plane deformation of the outer panel 3 are improved, and the buckling and out-of-plane deformation of the outer panel 3 can be suppressed. In particular, to improve the in-plane strength of the outer panel 3, the wide-width frame members 1B having a wider width is more effective than the standard-width frame members 1A as the vertical frame member 1 because the wide-width frame members 1B provide a more effective joint structure between the vertical frame members 1 and the horizontal frame members 2. Therefore, with the wide-width frame members 1B, the number of the vertical frame members 1 can be reduced without reducing the strengths of the body frame structure and the outer panel 3, and the cost can be further reduced.

In the illustrated example, the number of the vertical wide-width frame members 1B used is greater than the number of the vertical standard-width frame members 1A used. Therefore, the number of the vertical frame members 1 can be reduced by an amount corresponding to the increased number of the wide-width frame members 1B. In the present embodiment, the vertical standard-width frame members 1A are disposed along edges 4a and 5a of the openings for the window 4 and the entrance doors 5 as shown in FIG. 1, and the vertical wide-width frame members 1B are disposed between the vertical standard-width frame members 1A. At the edges 4a and 5a of the openings for the window 4 and the entrance doors 5, the required strength must be ensured only by the joint structure between each vertical frame member 1 and the end portions of the horizontal frame members 2 disposed on one side (the left or right side) of the each vertical frame member 1. In the present embodiment, the required strength is satisfied through the use of the vertical standard-width frame members 1A having a standard-height and a standard shape used in a normal strength design. In addition, the vertical wide-width frame members 1B are used for all the vertical frame members 1 between the vertical standard-width frame members 1A. In this manner, the number of the vertical frame members 1 is reduced. Basically, the standard shape of the vertical standard-width frame members 1A is a mechanical shape having a hat-shaped cross-section as exemplified in FIGS. 1, 3B, and 3C. However, a mechanical shape having a Z-shaped cross section may be used in some parts. When a hat-shaped cross-section is employed, flanges 1a on both sides can be used as weld-joining portions joined to other members such as the horizontal frame members 2, and accordingly, this structure is preferable to ensure the required strength.

As shown in FIGS. 2C to 2F, the vertical wide-width frame members 1B are flatter than the vertical standard-width frame members 1A. With such wide-width frame members 1B, the joint strength between the wide-width frame members 1B and the horizontal frame members 2 can be improved. Therefore, the flatter structure having a lower height than the structure using the standard-width frame members 1A can contribute to the improvement of the strength and load transfer characteristic of the body frame structure. The vertical wide-width frame members 1B have a pan-like shape including a flat portion and inwardly bent walls 1b disposed on the circumference of the flat portion. With this configuration, the simple bending of the circumferential edges of the wide-width frame members 1B can contribute to the improvement of the strength and load transfer characteristic of the body frame structure.

As shown in FIGS. 1 and 2A to 2C, the horizontal frame members 2 are disposed on the upper, lower, left, and right sides of the opening for the window 4 and include standard-height frame members 2A having a height close to the height of the standard-width frame members 1A, and low-height frame members 2B having a height less than the standard-height frame member 2A. The vertical wide-width frame members 1B are placed on the horizontal low-height frame members 2B from the interior side and weld-joined thereto. The end portions of the vertical wide-width frame members 1B are brought into abutment against the side portions of the horizontal standard-height frame members 2A, and flanges 1c extending from the edges of the bent walls 1b are placed on and weld-joined to the interior faces of the horizontal standard-height frame members 2A. At the upper and lower edges 4a of the opening for the window 4, the required strength must be ensured by the horizontal standard-height frame member 2A alone or only by the joint structure between the horizontal standard-height frame member 2A and the end portions of the vertical frame members 1 disposed therebelow. In the present embodiment, the required strength is satisfied through the use of frame members having a standard width and a standard shape used in a normal strength design. In addition, the vertical wide-width frame members 1B are placed on the interior face of the horizontal low-height frame members 2B and are weld-joined thereto. In this manner, while an increase in the height of the overlapping frame members is suppressed, high joint strength between the vertical wide-width frame members 1B and the horizontal low-height frame members 2B is ensured. The vertical wide-width frame members 1B including the flanges 1c extending from the bent walls 1b thereof are joined to the horizontal standard-height frame members 2A with the flanges 1c placed on the horizontal standard-height frame members 2A. In this manner, an increase in the height can be prevented, and the required joint strength between the frame members 1B and 2A can be improved. The standard shape of the horizontal standard-height frame members 2A is a mechanical shape having a hat-shaped cross-section as shown in FIGS. 2A to 2E, and flanges 2a on both sides of the horizontal standard-height frame members 2A are weld-joined to the outer panel.

The vertical standard-width frame members 1A extending along the side portions of the opening for the window 4 are placed between the upper and lower horizontal standard-height frame members 2A disposed in the upper and lower portions of the opening for the window 4. These vertical standard-width frame members 1A are placed in a straddling manner on the outer panel 3 and the end portions of the horizontal low-height frame members 2B disposed between these horizontal standard-height frame members 2A and are weld-joined thereto. Each of these vertical standard-width frame members 1A includes an upper frame member 1A1 and a lower frame member 1A2. The upper frame member 1A1 is brought into abutment against the side portion of the horizontal standard-height frame member 2A disposed in the upper portion of the opening for the window 4 and is joined thereto by a joint plate 11. The lower frame member 1A2 includes notches 12 that fit over the lower horizontal standard-height frame member 2A disposed in the lower portion of the opening for the window 4 and over the horizontal low-height frame members 2B disposed below the lower horizontal standard-height frame member 2A. More specifically, the notches 12 fit over the lower horizontal standard-height frame member 2A and the horizontal low-height frame members 2B at their interior-side portions between flange 2a thereof (i.e., the rear portions thereof). The flanges 2a of the above horizontal standard-height frame member 2A and the above horizontal low-height frame members 2B are weld-joined to the outer panel 3. The lower frame member 1A2 is placed on these flanges 2a and weld-joined to the above horizontal standard-height frame member 2A and the above horizontal low-height frame members 2B. The upper end of the lower frame member 1A2 is brought into abutment against the lower end of the upper frame member 1A1, and the lower frame member 1A2 is joined, by a joint plate 13, to the upper frame member 1A1 and the standard-height frame member 2A disposed in the lower portion of the opening for the window 4. Each of the vertical standard-width frame members 1A disposed along the side portions of the openings for the entrance doors 5 is placed in a straddling manner on and weld-joined to the outer panel 3 and the end portions of all the horizontal low-height frame members 2B. In addition, each of the vertical standard-width frame members 1A is joined, by a joint plate 14, to the end portion of the standard-height frame member 2A disposed in the lower portion of the opening for the window 4.

As described above, the vertical standard-width frame members 1A extending along the side portions of the opening for the window 4 include the upper frame members 1A1 having a standard height and a standard shape. The upper frame members 1A1 are weld-joined to the outer panel 3 at the side portions of the opening for the window 4, and this weld-joining directly reinforces the opening edges 4a of the outer panel 3. In addition, these upper frame members 1A1 are weld-joined to the end portions of the horizontal low-height frame members 2B. In this manner, an increase in height is suppressed, and satisfactory joint strength can also be obtained. The lower frame members 1A2 extending downwardly from the upper frame members 1A1 have a standard-height and a standard shape as well as a standard-width and can ensure high strength. In addition, these lower frame members 1A2 include the notches 12 that fit over the horizontal low-height frame members 2B at their interior portions between the flanges 2a thereof weld-joined to the outer panel 3. These lower frame members 1A2 are placed on the flanges 2a and weld-joined to the horizontal low-height frame members 2B. In this manner, the continuity between the lower frame members 1A2 and the upper frame members 1A1 is maintained, and high joint strength can be satisfied with almost no increase in height due to overlapping. The standard shape of each of the upper frame members 1A1 and the lower frame members 1A2 is a mechanical shape having a hat-shaped cross-section, and the flanges 1a on both sides thereof serve as the weld-joining portions that are weld-joined to the outer panel 3 and the rear portions or the flanges 2a of the horizontal low-height frame members 2B. However, to suppress an increase in height, the upper frame members 1A1 may have a mechanical shape having a Z-shaped cross-section in which a flat portion overlapping the end portions of the low-height frame members 2B serves as a flat flange. Even with this shape, the strength required for the joining structure between the upper frame members 1A1 and the low-height frame members 2B can be satisfied.

As described above, the vertical standard-width frame members 1A that is disposed along the side portions of the entrance doors 5 have a standard-height and a standard shape used in a normal strength design. These vertical standard-width frame members 1A are weld-joined to the outer panel 3 and can directly reinforce the opening edges for the entrance doors 5 in the outer panel 3. In addition, these vertical standard-width frame members 1A are weld-joined to the end portions of all the horizontal low-height frame members 2B without an increase in height, and the required joint strength can be ensured. The height of the horizontal standard-height frame members 2A is substantially the same as the height of the vertical standard-width frame members 1A. To ensure high joint strength, the joint plates 14 are used in the joint portions at which the end portions of the vertical standard-width frame members 1A are brought into abutment against the side portions of the horizontal standard-height frame members 2A and in the joint portions at which the end portions of the horizontal standard-height frame members 2A are brought into abutment against the side portions of the vertical standard-width frame members 1A. However, the number of points where the joint plate is required is small, and the use of the joint plates causes almost no increase in height. The vertical standard-width frame members 1A have mechanical shape having a hat-shaped cross-section, and the flanges 1a on both sides thereof serve as the weld-joined portions that are joined to the outer panel 3 and the rear portions of the horizontal low-height frame members 2. However, to suppress an increase in height, the vertical standard-width frame members 1A may have a mechanical shape having a Z-shaped cross-section in which a flat portion overlapping the end portions of the horizontal low-height frame members 2B serves a flat flange. Even with this shape, the strength required for the joining structure between the vertical standard-width frame members 1A and the low-height frame members 2B can be satisfied.

As can be seen from the figures, the height of the overlapping portions between the horizontal low-height frame members 2B and the vertical wide-width frame members 1B can be substantially the same as the height of the horizontal standard-height frame members 2A, and the height of the horizontal low-height frame members 2B can be substantially the same as the height of the wide-width frame members 1B. Therefore, the thickness of the body frame structure of the present embodiment is substantially the same or less than the height dimension of the horizontal standard-height frame members 2A. To effectively suppress an increase in the weight and ensure the required strength and resistance of the out-of-plane deformation of the outer panel, the width of the vertical wide-width frame members 1B overlapping the horizontal low-height frame members 2B can be 1.5 to 20 times the width of the low-height frame members 2B or less than the minimum arrangement spacing between the standard-width frame members.

Figure 3A:
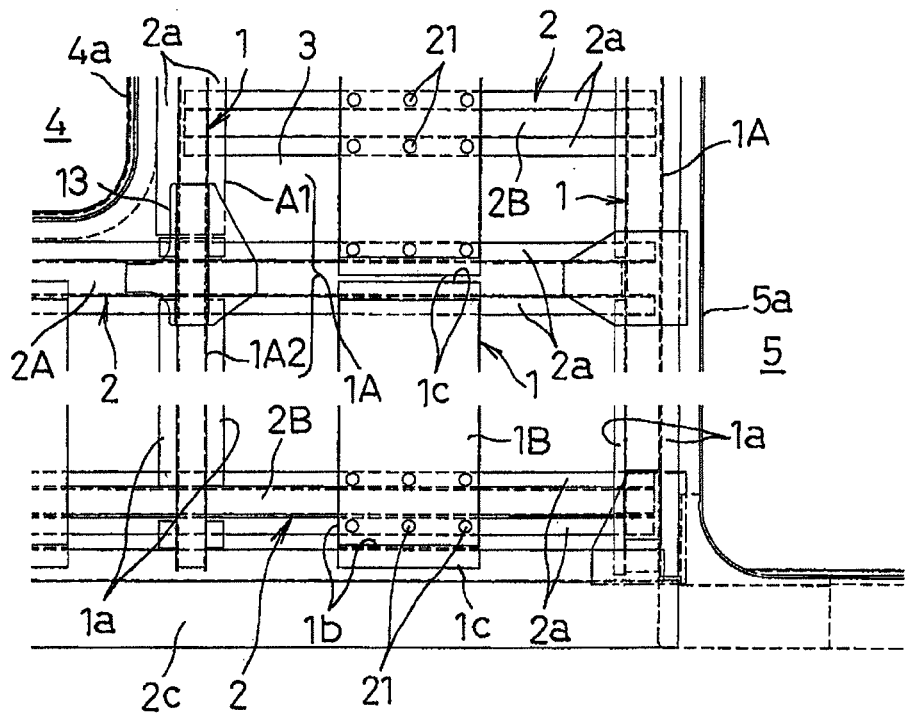
FIG. 3A is a front view from the inner side illustrating a main part between the lower portion of the opening for the window and the lower portion of the opening for an entrance door in the body frame structure shown in FIGS. 1 and 2A.
Figure 3B:
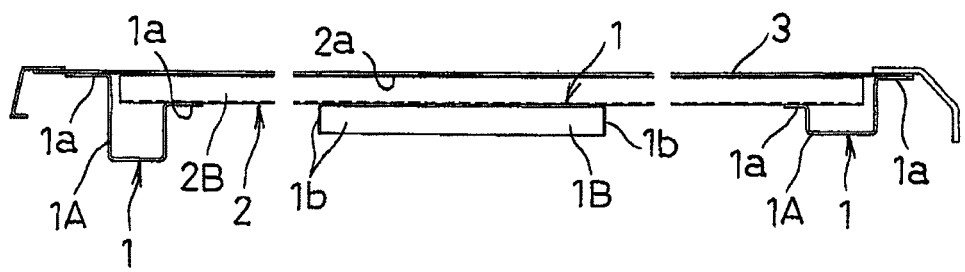
FIG. 3B is a horizontal cross-sectional view between the opening for the window and the opening for the entrance door.
Figure 3C:
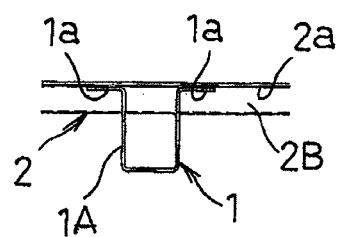
FIG. 3C is a partial cross-sectional view of a portion below the window.

When the horizontal frame members 2 are laser welded to the outer panel 3, it is preferable, in terms of the weld-joining strength and the appearance, that the depth t of partial penetration into the outer panel 3 be 0.1 mm to about 50% of the thickness of the outer panel 3. Moreover, when laser welding is performed, the horizontal frame members 2 are welded to the outer panel 3 before the welding of the vertical frame members 1. In this manner, the laser welding over the entire length of the horizontal frame members 2 can be performed in a continuous manner with good workability, and the sealing properties, which are required in some areas, can be obtained. In this case, the vertical frame members 1 are subsequently weld-joined to the previously welded horizontal frame members 2. Any welding method may be used to weld the vertical frame members 1 after the welding of the horizontal frame members 2, so long as the vertical frame members 1 can be welded from the interior side. Specifically, plug welding or laser welding is used. When the vertical and horizontal frame members 1 and 2 are spot welded to each other, the welding operation must be performed on both sides of the overlapping portion. Therefore, the vertical and horizontal frame members 1 and 2 are first weld-joined to each other, and subsequently the assembled frame structure is placed on the outer panel 3 and is spot-welded from the interior and exterior sides. In such a case, working holes 21 must be previously formed in the vertical frame members 1 as shown in FIGS. 1, 2A, and 3A so that portions of the horizontal frame members 2 which are hidden by the vertical frame members 1 can be spot welded to the outer panel 3. In the illustrated example, the working holes 21 are formed in the vertical wide-width frame members 1B.

As shown in FIGS. 1, 2, and 3A, a rocker rail 22 to be joined to the underframe of a vehicle is joined to the lower edge of the outer panel 3, and the lower ends of all the vertical frame members 1, i.e., the vertical standard-width frame members 1A and the vertical wide-width frame members 1B are weld-joined to the rocker rail 22.

Industrial Applicability

The present invention can be practically used for reinforcement of the outer panels of railway vehicles by the frame members and is advantageous in terms of workability, cost, strength, appearance, and the like.

The invention claimed is:

1. A body frame structure of a railway vehicle, comprising: an outer panel;
a horizontal frame member; and
a vertical frame member, the vertical and horizontal frame members being joined to an interior face of the outer panel, the horizontal frame member being disposed on the outer panel so as to be positioned between the vertical frame member and the outer panel the vertical frame member being placed on the horizontal frame member from an interior side thereof and weld-joined to the horizontal frame member, the vertical frame member including a standard-width frame member and a wide-width frame member having a width greater than a width of the standard-width frame member, and the vertical frame member is positioned at ends of the horizontal frame member, the ends of the horizontal frame member being provided in a longitudinal direction of the horizontal frame member.

2. The body frame structure of a railway vehicle according to claim 1, wherein the wide-width frame member is flatter than the standard-width frame member.

3. The body frame structure of a railway vehicle according to claim 2, wherein the wide-width frame member has a pan-like shape including a flat portion and inwardly bent walls disposed on a circumference of the flat portion.

4. The body frame structure of a railway vehicle according to claim 3, wherein: the horizontal frame members are disposed on upper, lower, left, and right sides of an opening for a window and include: a standard-height frame member having a height close to a height of the vertical standard-width frame member, and a low-height frame member having a height less than the height of the standard-height frame member; the vertical wide-width frame member is placed on and weld-joined to the horizontal low-height frame member; and an end portion of the vertical wide-width frame member includes a flange extending from an edge of one of the bent walls and is brought into abutment against and weld-joined to a side portion of the horizontal standard-height frame member with the flange placed on an interior face of the horizontal standard-height frame member.

5. The body frame structure of a railway vehicle according to claim 4, wherein a width of the vertical wide-width frame member overlapping the horizontal low-height frame member is 1.5 to 20 times a width of the horizontal low-height frame member or less than a minimum arrangement spacing between the vertical standard-width frame members.

6. The body frame structure of a railway vehicle according to claim 4, wherein a height of an overlapping portion between the horizontal low-height frame member and the vertical wide-width frame member is substantially the same as a height of the horizontal standard-height frame member.

7. The body frame structure of a railway vehicle according to claim 4, wherein a height of the horizontal low-height frame member is substantially the same as a height of the vertical wide-width frame member.

8. The body frame structure of a railway vehicle according to claim 4, wherein:
the vertical standard-width frame member extending along a side portion of the opening for the window is placed between the upper and lower horizontal standard-height frame members disposed in an upper portion and a lower portion of the opening for the window, and the vertical standard-width frame member is placed in a straddling manner on, and weld-joined to, the outer panel and an end portion of the horizontal low-height frame member disposed between the horizontal standard-height frame members;
the vertical standard-width frame member includes an upper frame member and a lower frame member, the upper frame member being brought into abutment against a side portion of the upper horizontal standard-height frame member disposed in the upper portion of the opening for the window and being joined thereto by a joint plate, the lower frame member including a notch that fits over the lower horizontal standard-height frame member at an interior-side portion between flanges thereof and over the horizontal low-height frame member disposed below the lower horizontal standard-height frame member, the flanges being weld-joined to the outer panel, the lower frame member being placed on the flanges and weld joined to the lower horizontal standard-height frame member and the horizontal low-height frame members, an upper end of the lower frame member being brought into abutment against a lower end of the upper frame member and being joined to the upper frame member and the lower horizontal standard-height frame member disposed in the lower portion of the opening for the window by another joint plate; and
another vertical standard-width frame member disposed along a side portion of an entrance door is placed in a straddling manner on, and weld-joined to, the outer panel and the end portions of all the low-height frame members, and the vertical standard-width frame member is also joined to the lower horizontal standard-height frame member disposed in the lower portion of the opening for the window by another joint plate.

9. The body frame structure of a railway vehicle according to claim 1, wherein the standard-width frame member is disposed along edges of openings for a window and an entrance door, and the wide-width frame member is disposed between the standard-width frame members.

10. The body frame structure of a railway vehicle according to claim 1, wherein the number of the wide-width frame member is greater than that of the standard-width frame member.

* * * * *